United States Patent
Venkatesan et al.

(10) Patent No.: US 6,490,354 B2
(45) Date of Patent: *Dec. 3, 2002

(54) LIGHTWEIGHT WORD-ORIENTED TECHNIQUE FOR GENERATING A PSEUDO-RANDOM SEQUENCE FOR USE IN A KEYSTREAM OF A STREAM CIPHER

(75) Inventors: Ramarathnam R. Venkatesan, Bellevue, WA (US); Dan Boneh, Stanford, CA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,945

(22) Filed: Jun. 23, 1998

(65) Prior Publication Data

US 2002/0006195 A1 Jan. 17, 2002

(51) Int. Cl.$^7$ .............................................. H04L 9/00
(52) U.S. Cl. ............................ 380/43; 380/42; 380/44; 380/46
(58) Field of Search ............................ 380/42, 43, 44, 380/46

(56) References Cited

U.S. PATENT DOCUMENTS 5,825,886 A * 10/1998 Adams et al. ................. 380/28

OTHER PUBLICATIONS

Claude Elwood Shannon Collected Papers, ed. N.J.A. Sloane and Aaron D. Wyner, "Communication Theory of Secrecy Systems", 1993, pp. 107–114.*

* cited by examiner

Primary Examiner—Gail Hayes
Assistant Examiner—Douglas J. Meislahn
(74) Attorney, Agent, or Firm—Michaelson & Wallace; Peter L. Michaelson (57) ABSTRACT

A word-oriented technique for generating a pseudo-random sequence, e.g., a keystream (17) for use in a stream cipher. Specifically, the technique utilizes two different arrays (653, 657) with each array having illustratively 256 32-bit elements. One array (653) contains a 256 element 32-bit S-box. An output stream generated by the S-box, i.e., $S_t$, is applied as one input to a first hash function. This hash function, in response to input $S_t$ multiplied by a variable, C, provides the output keystream. S-box element $S_t$ is then updated through a second hash function having, as its input, the current value of $S_t$ multiplied by the variable C. The variable, C, initially a random variable, is itself updated, for use during a next iteration, through an additive combination, of its current value and a corresponding element in the second array (G), i.e., $G_t$. Both the S-box and G array can be initialized by, e.g., entirely filling each of these arrays with random 32-bit values. This technique, when used to generate a keystream for a stream cipher, appears to be just as secure as a conventional RC4 cipher and, by operating on a word- rather than a byte-level, is considerably faster than an RC4 keystream generator. Hence, this technique, when used in cryptographic applications, is particularly well suited for use in devices that have limited computational resources and would not be amenable to use of the RC4 stream cipher.

45 Claims, 4 Drawing Sheets

LIGHTWEIGHT WORD-ORIENTED TECHNIQUE FOR GENERATING A PSEUDO-RANDOM SEQUENCE FOR USE IN A KEYSTREAM OF A STREAM CIPHER

BACKGROUND OF THE DISCLOSURE

1. Field of the Invention

The invention relates to cryptography, particularly a word-oriented technique for generating a pseudo-random sequence, such as a keystream for use in, e.g., a stream cipher. Advantageously, this technique is not only fast and secure but also requires relatively little processing power to implement, i.e., is "lightweight".

2. Description of the Prior Art

Over the centuries, for as long as information has been communicated between two individuals, the information has been susceptible to third-party interception, eavesdropping, compromise and/or corruption. Clearly, the problem of securely protecting information from such acts has existed for quite a long time.

Traditionally, this problem has been handled through the development, over the years, of increasingly sophisticated cryptographic techniques. One class of these techniques involves key-based ciphers. Through a key-based cipher, sequences of intelligible data, i.e., plaintext, that collectively form a message are each mathematically transformed, through an enciphering algorithm, into seemingly unintelligible data, i.e., so-called ciphertext. Not only must the transformation be completely reversible, i.e., two way in the sense that the ciphertext must be invertable back to its corresponding original plaintext but also on a 1:1 basis, i.e., each element of plaintext can only be transformed into one and only one element of ciphertext. In addition, a particular cipher that generated any given ciphertext must be sufficiently secure from cryptanalysis. To provide a requisite level of security, a unique key is selected which defines only one unique corresponding cipher, i.e., precluding, to the extent possible, a situation where multiple differing keys each yields reversible transformations between the same plaintext-ciphertext correspondence. The strength of any cryptographic technique and hence the degree of protection it affords from third-party intrusion is directly proportional to the time required, by a third-party, to perform cryptanalysis, e.g., with a key-based cipher to successfully convert the ciphertext into its corresponding plaintext without prior knowledge of the key. While no encryption technique is completely impervious from cryptanalysis, an immense number of calculations and an extremely long time interval required therefor—given the computing technology then available—required to break a cipher without prior knowledge of its key effectively renders many techniques, for all practical intents and purposes, sufficiently secure to warrant their widespread adoption and use.

Key-based ciphers include both symmetric and public-key algorithms. Inasmuch as public-key algorithms are not relevant to the present invention, they will not be discussed any further.

Symmetric algorithms are those through which the encryption key can be calculated from the decryption key, and vice versa. Generally, in these algorithms, the two keys are the same, with the security of the algorithm resting, in good measure, on the security of the key. Symmetric algorithms themselves are divided into stream ciphers (also referred to as "stream algorithms") and block ciphers. A stream cipher operates on a bit or byte of plaintext at a time, in contrast to block ciphers which operates on a predefined group of bits (a "block", such as 64 bits) of plaintext at a time. Since block ciphers are also not relevant to the present invention, they will also not be discussed any further.

A very simple form of a stream cipher relies on generating, at an encryption end and through a so-called keystream generator, a pseudo-random sequence (K) of bits $k_1, k_2, k_3, \ldots, k_n$. These bits are combined, on a bit-by-bit exclusive-OR (XOR) basis, with incoming bits of plaintext (P), specifically $p_1, p_2, p_3, \ldots, p_n$ to yield resulting bits (C), specifically $c_1, c_2, c_3, \ldots, c_n$, of ciphertext. At a decryption end, the bits of ciphertext are combined, again on a bit-by-bit XOR basis, with an identical keystream to recover the plaintext bits. With this cipher, the security of the cipher itself, apart from that of the key itself, rests entirely on the keystream, i.e., the level of difficulty which a cryptanalyst encounters in attempting to discern, from the ciphertext, the algorithm that generates the pseudo-random keystream. With a stream cipher, both the encrypting and decrypting ends of a communications link use identical keystream generators that are initialized in the same manner and operate in synchronization with respect to the ciphertext. Identical keystreams assure, in the absence of transmission and other errors, that the recovered plaintext will match the incoming plaintext. For further details on stream ciphers, the reader is referred to B. Schneier, *Applied Cryptography—Second Edition* (© 1996, John Wiley and Sons) pages 197–199 and 397–398; and G. Simmons, *Contemporary Cryptography* (©1992, IEEE Press), pages 67–75—which are all incorporated by reference herein.

As recently as a few years ago, if a cipher was of such complexity that it required on the order of man-years or more to break, in view of the state of the processing technology then available to do so, the underlying cryptographic technique was viewed by many as rendering a sufficient degree of security to warrant its use. However, computing technology continues to rapidly evolve. Processors, once unheard of just a few years ago in terms of their high levels of sophistication and speed, are becoming commercially available at ever decreasing prices. Consequently, processing systems, such as personal computers and workstations, that were previously viewed as not possessing sufficient processing power to break many so-called "secure" cryptographic ciphers are now, given their current power and sophistication, providing third parties with the necessary capability to effectively break those same ciphers. What may have taken years of continual computing a decade ago can now be accomplished in a very small fraction of that time. Hence, as technology evolves, the art of cryptography advances in lockstep in a continual effort to develop increasingly sophisticated cryptographic techniques that withstand correspondingly intensifying cryptanalysis.

Over the past few years, the Internet community has experienced explosive and exponential growth—growth that, by many accounts, will only continue increasing. Given the vast and increasing magnitude of this community, both in terms of the number of individual users and web sites and sharply reduced costs associated with electronically communicating information, such as e-mail messages and electronic files, over the Internet between one user and another as well as between any individual client computer and a web server, electronic communication, rather than more traditional postal mail, is rapidly becoming a medium of choice for communicating information, whether it be, e.g., an e-mail message or a program update file. In that regard, the cost of sending an electronic file between computers located on opposite sides of the Earth is a very small fraction of the cost associated with storing that file on a diskette (or other media) and transporting that media between these locations even through the least expensive class of postal mail service. However, the Internet, being a publicly accessible network, is not secure and, in fact, has been and increasingly continues to be a target of a wide variety of attacks from various individuals and organizations intent on eavesdropping, intercepting and/or otherwise compromising or even corrupting message traffic flowing on the Internet or illicitly penetrating sites connected to the Internet. This security threat, in view of the increasing reliance placed on use of the Internet as a preferred medium of communication, exacerbates the efforts in the art, otherwise fostered by primarily continuing advances in computing power, to develop increasingly strong cryptographic techniques that provide enhanced levels of security to electronic communication.

Stream ciphers, given their nature of generating extended pseudo-random sequences, would be particularly useful in encrypting extremely long plaintext streams, such as video, or packet traffic, such as TCP/IP packets, appearing on, e.g., a Internet connection.

Currently, a conventional stream cipher that encounters rather widespread use is an "RC4" stream cipher ("RC4" is a registered trademark of RSA Data Security Inc. of Redwood City, Calif.). Advantageously, the RC4 stream cipher is independent of the plaintext being encrypted and is quite easy to implement. This cipher is claimed in the art to be immune to differential and linear cryptanalysis and is highly non-linear with approximately $2_{1700}$ different states. This cipher relies on a 256-value substitution box, a so-called "S-box", to generate each byte of an output keystream. This S-box initially contains entries which are permutations, as a function of a variable length key, of values 0 through 255. In use, the contents of the S-box slowly evolve with use in a fashion that ensures that every element in the box randomly changes; hence, supporting a belief in the art that the output byte is a secure pseudo-random sequence. The RC4 cipher is byte-based and generates an output byte that is XORed with either a byte of plaintext to produce a corresponding byte of ciphertext, or with a byte of ciphertext to produce a corresponding byte of recovered plaintext.

Presently, the RC4 cipher appears to be sufficiently secure to thwart realistic cryptanalysis and, given its ease of implementation, quite useful in a broad range of applications. However, in some applications, such as real-time encryption of multi-stream video data, such as in a video server, as well as keyboard entries at a local client computer, this cipher has proven to be too slow to be effective. Moreover and currently, TCP/IP layer encryption—which would, if implemented through a stream cipher, be rather advantageous—can not be effectively provided in real-time in certain high-data rate applications, such as video streaming, due to excessive processing time required to generate the keystream.

Furthermore, a multitude of consumer and other low-end products, such as, e.g., remote controls, home devices and personal digital assistants, are currently incorporating microprocessors, though with rather limited processing capacity (e.g., diminished execution speed). To provide sufficient security for their users, these devices should implement some form of encrypted communication. Unfortunately, the limited computing power currently available in such devices, effectively precludes use of the RC4 cipher, or other conventional keystream generators, in such devices and hence, to a certain extent, frustrates the ability of these devices to support sufficiently secure encrypted communication. This result, is particularly evident with respect to the RC4 stream cipher given its byte-based nature and hence relatively slow throughput.

Therefore, a need exists in the art for a cryptographic technique for generating a pseudo-random keystream for use in, e.g., a stream cipher, that is considerably faster than conventional algorithms, such as the RC4 cipher, and provides at least the same, if not a greater, level of security as does these algorithms. Such a technique would advantageously find use in a multitude of applications which, owing to, e.g., high data rates or limited available processing resources, are simply not amenable to use of the RC4 cipher or other conventional keystream generators.

SUMMARY OF THE INVENTION

Advantageously, our inventive technique for generating a pseudo-random sequence satisfies this need and overcomes the deficiencies in the art by utilizing, in accordance with our broad inventive teachings, two different arrays, with each array having illustratively 256 32-bit elements. One array, the S array, contains a 256 element 32-bit S-box. An output stream generated by the S-box, i.e., $S_t$, is applied as one input to a first predefined function, e.g., a first hash function. This predefined function, in response to this input, $S_t$, multiplied by a variable, C, provides the output pseudo-random sequence, e.g., the keystream. The S-box element $S_t$ is then updated through a second predefined function, e.g., another hash function, having, as its input, the current value of $S_t$ multiplied by the variable C. The variable, C, initially a random variable, is itself updated, for use during a next iteration, through an additive combination, of its current value and a corresponding element in the second array (G), i.e., $G_t$. Both the S-box and G array can be initialized by, e.g., entirely filling each of these arrays with random 32-bit values.

Our inventive technique advantageously operates on a word level, e.g., 32 bits, rather than on a byte level. As such, this technique is considerably faster than the RC4 keystream generator. Moreover, this technique, when used to generate a keystream for use in a stream cipher, appears to be just as secure as does the conventional RC4 cipher. Consequently, our technique is particularly well suited for use in devices, e.g., consumer and other low-end products, that have limited computational resources and would not be amenable to use of the RC4 cipher.

As a feature of our specific inventive teachings, a further random variable and another hash function can be incorporated into our inventive technique, either separately or together, to further enhance its security, if desired, when used in cryptographic application.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of our present invention can be utilized in any one of an extremely wide range of applications where fast and secure encryption of information is needed, such as for real-time video applications or real-time encryption of keyboard entry, and/or where processing power is limited, such as for use in remote control or other "small" devices. Information, in this instance and as the term will be used hereinafter, is defined as generically encompassing all information that can be stored digitally, regardless of its specific content, i.e., whether that information is executable program code or data of one form or another. For purposes of simplification, we will discuss our invention in the context of use in an client-server processing environment to encrypt packetized messages which are to be communicated over an insecure network, such as the Internet.

A. Overview

Figure 1:
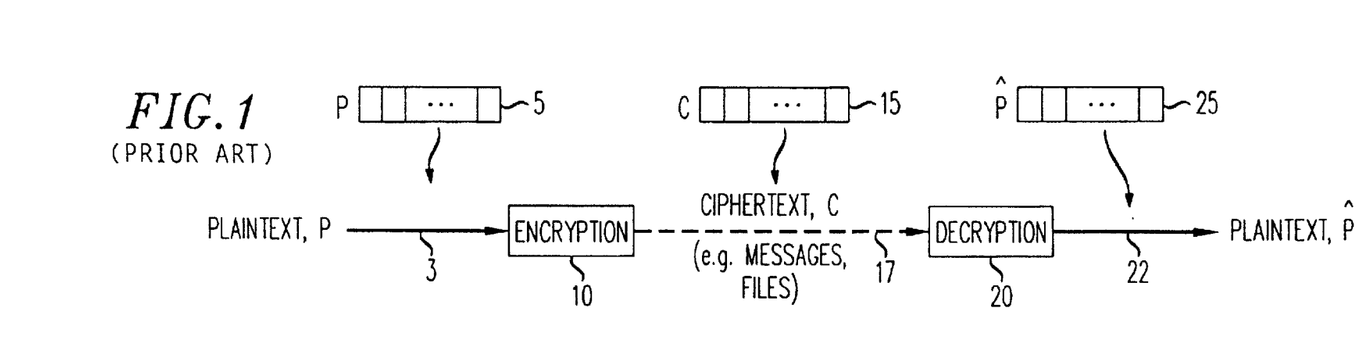
FIG. 1 depicts a diagram of an overall cryptographic process that incorporates the teachings of the present invention.

FIG. 1 depicts a diagram of an overall cryptographic process that incorporates the teachings of the present invention. As shown, incoming plaintext information 5 emanating from an originating (source) location is organized into so-called "messages". Each such message, designated as P, appearing on input line 3 contains a succession of words, typically 32-bits in length. Each such plaintext word is encrypted, through our inventive cryptographic technique as will be described in detail below in conjunction with FIGS. 4, 6A and 6B, into a corresponding word of ciphertext 15. A ciphertext message, designated as C, is formed of successive 32-bit words of ciphertext. Resulting ciphertext message C is then stored or transferred, through a given modality, e.g., a network communication channel, represented by dashed line 17, to a recipient (destination) location. Here, the ciphertext message is decrypted to yield recovered plaintext message 25 also denoted as plaintext message $\hat{P}$, which is identical in all aspects to original plaintext message P.

B. Illustrative Processing Environment

Figure 2:
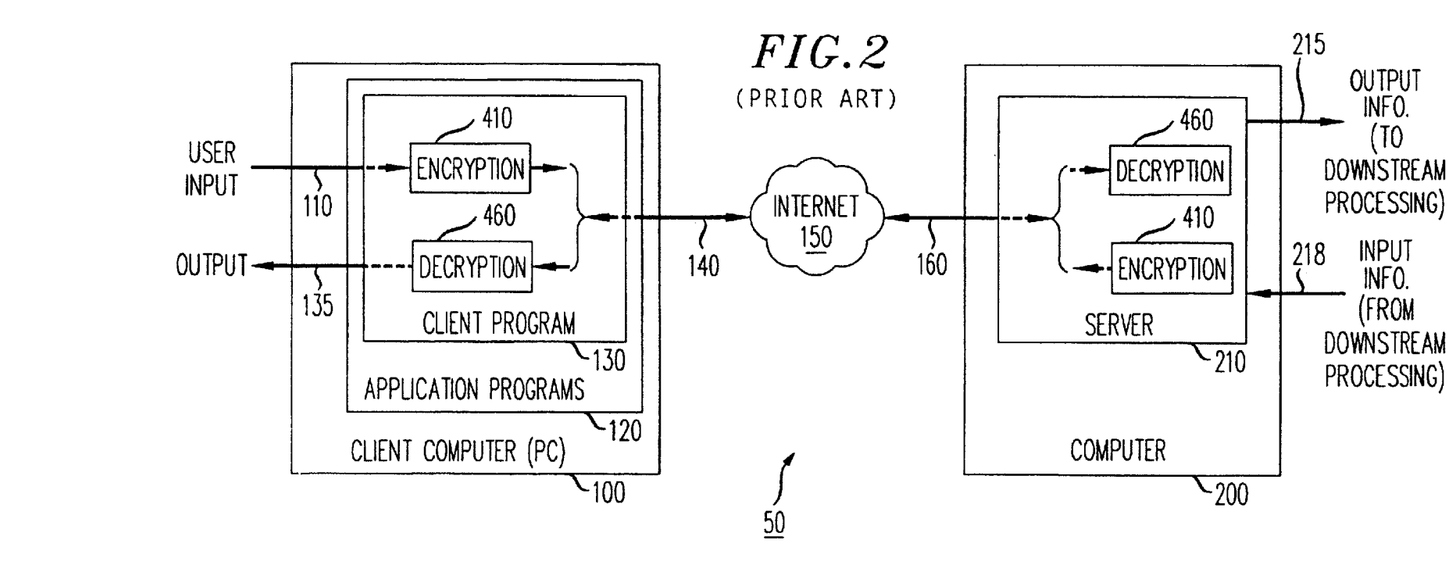
FIG. 2 depicts a high-level block diagram of a typical and conventional Internet-based client-server processing environment that illustratively utilizes the present invention.

With the above in mind, consider FIG. 2 which depicts a high-level block diagram of client-server processing environment 50 that utilizes the present invention.

As shown, this environment contains computer 200 which implements server 210, the latter illustratively being a web server. A number of individual remotely-located client computers, each being illustratively a personal computer (PC), of which only one such client, i.e., client computer 100, is specifically shown, is connected using appropriate communications channels, such as channels 140 and 160, through an insecure communications network, here shown as illustratively Internet 150, to computer 200. A user (not specifically shown), stationed at client computer 100 and desirous of obtaining information from the server can invoke a corresponding client program at that computer. The client program forms one of a number of application programs 120 that collectively reside within and are executed by client computer 100. Though the client program is specifically shown as residing within the application programs, the former can also be implemented as a component, such as a web browser, of an operating system (O/S), for example, of O/S 337 shown in FIG. 3. Server 210, shown in FIG. 2, can implement any of a wide variety of application functions including, for example, a commerce server, a banking server, an electronic mail or a file server. As to electronic commerce, the user might desire to conduct a commercial transaction through server 210 that involves providing (as symbolized by line 110) information to the server, such as an account number of the user at a financial institution and payment instructions to transfer funds to a payee, or obtaining (as symbolized by line 135) information from the server, such as available account or credit balances of the user, which, in either event, is confidential to that user and needs to be encrypted.

Network 150, being illustratively the Internet, is susceptible to being compromised by a third-party. In that regard, the third party could intercept a message then being carried over the network and emanating from, e.g., client computer 100, for, e.g., an on-going financial transaction involving a user situated thereat.

To safeguard the confidential or proprietary nature of the information, transiting over network 150, between client computer 100 and computer 200, from third-party access, both the client program 130 and server 210 each utilize cryptographic communication through incorporation of encryption 410 and decryption 460 therein. As such, packetized messages destined for network carriage and generated by one network application peer, either client program 130 or server 210, can be encrypted at a TCP/IP layer by encryption procedure 410 therein to yield corresponding packetized ciphertext messages, which, in turn, are then each transmitted over network 150 to the other network application peer. Similarly, packetized ciphertext messages received, from the network, by each of the peers can be decrypted by decryption 460 therein, at a TCP/IP layer, to yield an appropriate recovered packetized plaintext message. Encryption 410 and decryption 460 are inverse procedures of each other and can be provided, within client computer 100, through illustratively client program 130.

C. Client Computer 100

Figure 3:
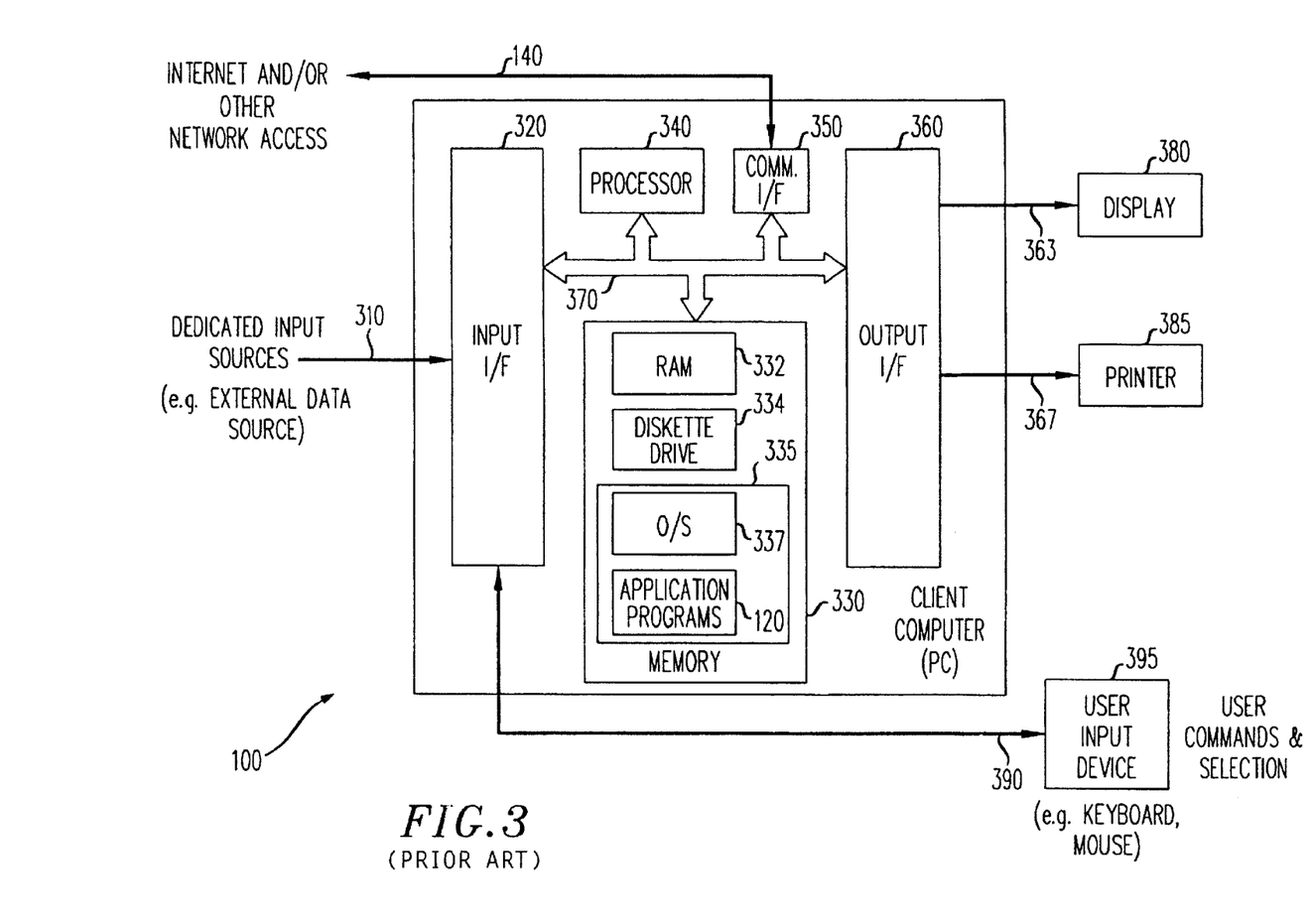
FIG. 3 depicts a block diagram of conventional client computer 100 shown in FIG. 2 in which the present invention is implemented.

FIG. 3 depicts a block diagram of client computer (PC) 100.

As shown, client computer 100 comprises input interfaces (I/F) 320, processor 340, communications interface 350, memory 330 and output interfaces 360, all conventionally interconnected by bus 370. Memory 330, which generally includes different modalities, including illustratively random access memory (RAM) 332 for temporary data and instruction store, diskette drive(s) 334 for exchanging information, as per user command, with floppy diskettes, and non-volatile mass store 335 that is implemented through a hard disk, typically magnetic in nature. Mass store 335 may also contain a CD-ROM or other optical media reader (not specifically shown) (or writer) to read information from (and write information onto) suitable optical storage media. In addition, mass store 335 also stores operating system (O/S) 337 and application programs 120; the latter illustratively containing client program 130 (see FIG. 2) which incorporates our inventive cryptographic technique. O/S 337, shown in FIG. 3, may be implemented by any conventional operating system, such as the WINDOWS NT operating system. Given that, we will not discuss any components of O/S 337 as they are all irrelevant. Suffice it to say, that the client program, being one of application programs 120, executes under control of the O/S.

Advantageously, our present inventive technique for generating a pseudo-random sequence, here a keystream for use in a stream cipher, when embedded for use within a client program requires no user interaction and thus, in use, can be substantially, if not totally, transparent to the user.

As shown in FIG. 3, incoming information can arise from two illustrative external sources: network supplied information, e.g., from the Internet and/or other networked facility, through network connection 140 to communications interface 350, or from a dedicated input source, via path(es) 310, to input interfaces 320. Dedicated input can originate from a wide variety of sources, e.g., an external data source. In addition, input information, in the form of files or specific content therein, can also be provided by inserting a diskette containing the information into diskette drive 334 from which computer 100, under user instruction, will access and read that information from the diskette. Input interfaces 320 contain appropriate circuitry to provide necessary and corresponding electrical connections required to physically connect and interface each differing dedicated source of input information to computer system 100. Under control of the operating system, application programs 120 exchange commands and data with the external sources, via network connection 140 or path(es) 310, to transmit and receive information typically requested by a user during program execution.

Input interfaces 320 also electrically connect and interface user input device 395, such as a keyboard and a mouse, to computer system 100. Display 380, such as a conventional color monitor, and printer 385, such as a conventional laser printer, are connected, via leads 363 and 367, respectively, to output interfaces 360. The output interfaces provide requisite circuitry to electrically connect and interface the display and printer to the computer system. As one can appreciate, our present inventive technique can operate with any type of digital information regardless of the modalities through which client computer 100 will obtain that information, store and/or communicate that information.

Furthermore, since the specific hardware components of computer system 100 as well as all aspects of the software stored within memory 335 (including TCP/IP layer encryption in general and related TCP/IP processing), apart from the modules that implement the present invention, are conventional and well-known, they will not be discussed in any further detail. Generally speaking, computer 200 has an architecture that is quite similar to that of client computer 100.

D. Inventive Cryptographic Technique

Our inventive technique generates a pseudo-random sequence, for use as, e.g., a keystream in a stream cipher, in a manner that is considerably faster than conventional algorithms, such as a generator in the RC4 cipher, and, when used in such a cipher, provides at least the same, if not a greater, level of security as does these algorithms. Given this, our inventive technique should advantageously find use in a multitude of applications which, owing to, e.g., high data rates or limited available processing resources, are simply not amenable to use of the RC4 cipher or other conventional keystream generators.

To enhance reader understanding of our present invention and prior to describing our inventive technique, we will first digress slightly to provide a concise generalized description of a simple stream cipher followed by describing the RC4 stream cipher as it is known in the art.

Figure 4:
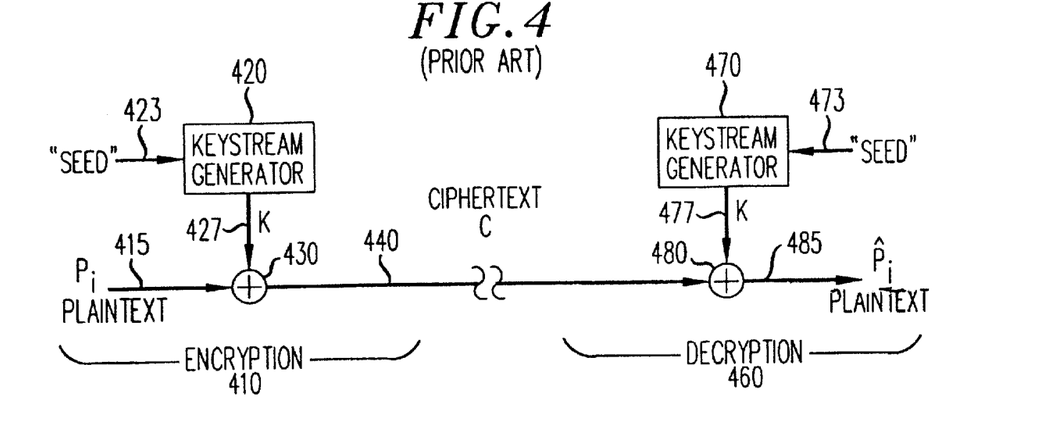
FIG. 4 depicts a simple stream cipher, as conventionally used in the art.

FIG. 4 depicts a simple stream cipher, as conventionally used in the art. As shown, within encryption 410 and at a source location, keystream generator 420, given an input value or series of values (referred to collectively as a "seed") appearing on lead 423 generates, on lead 427, a pseudo-random sequence (K) of bits $k_1, k_2, k_3, \ldots, k_n$. These "keystream" bits (K) are combined, on a bit-by-bit basis through exclusive-OR operation 430, with incoming bits of plaintext (P), specifically $p_1, p_2, p_3, \ldots, p_n$ to yield resulting bits of ciphertext (C), specifically $c_1, c_2, c_3, \ldots, c_n$. The ciphertext is applied through link 440, typically a communications link of one form or another, to a destination location. To implement decryption 460 at the destination location, the bits of ciphertext are combined, again on a bit-by-bit XOR basis, though here through operation 480, with an identical keystream, appearing on lead 477, to recover the plaintext bits. This keystream, at the destination location, is generated through keystream generator 470 which is identical to generator 420. To ensure that the ciphertext is properly decrypted into plaintext, both keystream generators utilize the same seed and operate synchronously with respect to the ciphertext to generate identical keystreams. In that regard, the exact same bytes of keystream bits, K, are used to encrypt, at the source location (i.e., an encrypting end), a byte of original plaintext into a byte of ciphertext and, at the destination location (i.e., a decrypting end), to decrypt that same byte of ciphertext into a corresponding byte of plaintext, $\hat{P}_i$, such that the recovered and original bytes of plaintext are the same. For further details on stream ciphers, the reader is referred to B. Schneier, *Applied Cryptography—Second Edition* (© 1996, John Wiley and Sons) pages 197–199 and 397–398; and G. Simmons, *Contemporary Cryptography* (©1992, IEEE Press), pages 67–75—which are all incorporated by reference herein.

Figures 5A, 5B:
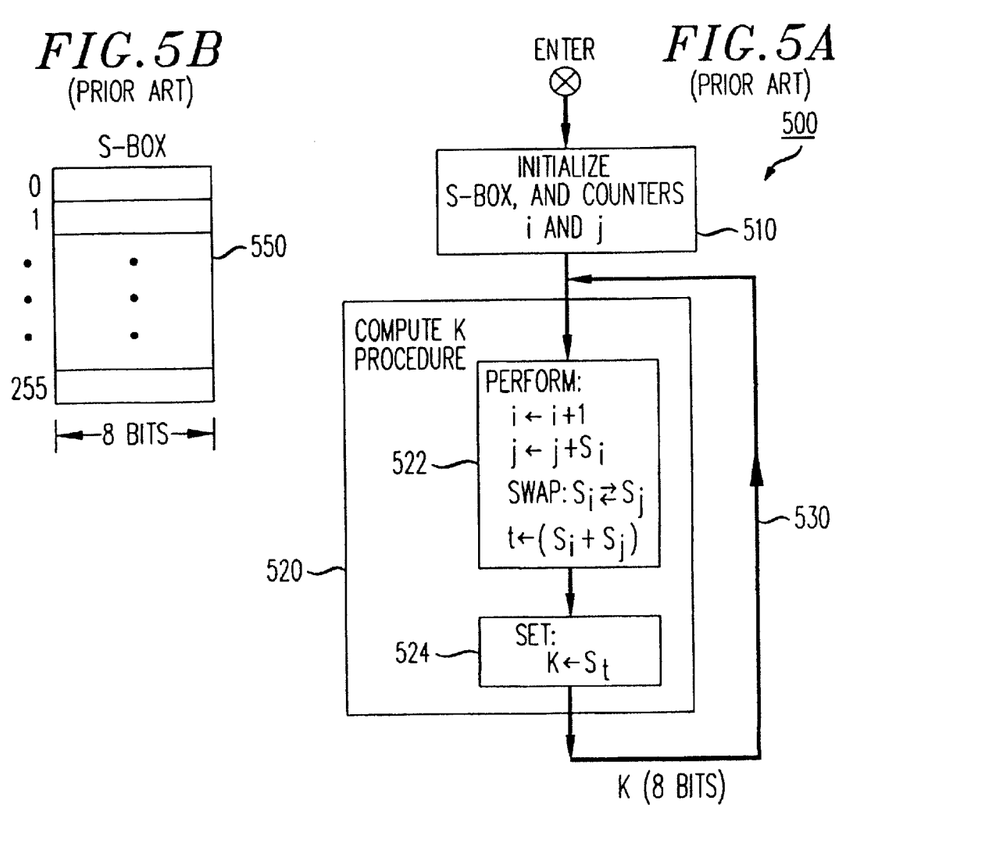
FIG. 5A depicts a flowchart of conventional RC4 keystream generator procedure 500 as could be implemented in a client computer.
FIG. 5B graphically depicts S-box 550 as used in conventional procedure 500 shown in FIG. 5A.

One commonly used stream cipher is the RC4 cipher. FIG. 5A depicts a flowchart of conventional RC4 keystream generator procedure 500 as could be implemented in, e.g., an client program within a client computer. This procedure utilizes, as shown in FIG. 5B, array S, also denoted as array 550, of 8-bit values; this array is commonly referred to as an S-box ("substitution box"). For ease of reference, the reader should simultaneously refer to FIGS. 5A and 5B throughout the following discussion.

Upon entry into procedure 500, initialization operation 510 first occurs. Through this step, the contents of S-Box 550 are initialized and two counters used by the procedure, namely counters i and j, are both set to zero. S-box 550 contains 256 8-bit elements. The S-box can be initialized in various ways. One way is to entirely fill this array with random 8-bit permutations ranging from 0 to 255.

Another conventional way to fill the S-box involves several steps. First, the S-box is filled in a linear fashion beginning with a value of zero in element zero, a value of one in element one and so forth until the last element contains a value of 255. An index counter, j, is set to zero. Thereafter, the following operations occur iteratively for all elements, $S_i$, in the S-box, as indicated in the following pseudo-code:

for i=0 to 255;

$j < (j+S_i+K_s) \bmod 256$ swap $S_i$ and $S_j$ in the S-box end where: $K_s$ is a predefined 8-bit seed value.

Once the initialization has completed, Compute K procedure 520 is iteratively executed to generate a continuous keystream, with each successive byte of the keystream being generated by a corresponding execution of block 520. Within this procedure, execution first proceeds to block 522 to, on a (mod 256) basis, perform each of the following steps in order:

(a) increment the value of counter i by one;
(b) additively increase the value of counter j by the contents of element i in S-box 550;
(c) swap the contents of elements i and j (i.e., elements $S_i$ and $S_j$, respectively) in S-box 550; and
(d) set the value of variable t equal to an additive combination of the contents of elements i and j in S-box 550, i.e., $S_i$ and $S_j$, respectively.

After these operations are performed, execution proceeds to block 524 which, when executed, sets an output keystream byte, K, equal to the current contents of element $S_t$ in S-box 550. As a result of the above steps, the contents of the S-box slowly change with use, the counters i and j respectively ensure that every element changes and does so randomly. Once this keystream byte is produced, execution iterates back, via path 530, to block 520 to calculate a next successive keystream byte, and so on, as long as the RC4 keystream generator is being operated.

While the RC4 keystream generator, as produced through block 520, appears to be sufficiently secure, for certain applications, this generator is either too slow to accommodate real-time encryption or requires excessive processing capability for use in devices with limited processing ability.

We have advantageously overcome these deficiencies in the art by utilizing, in accordance with our broad inventive teachings, two different arrays, rather than one array—the latter being used in the conventional RC4 cipher, with each array having illustratively 256 32-bit elements. One array, the S array, contains a 256 element 32-bit S-box. An output stream generated by the RC4 keystream generator, from the S-box, i.e., $S_t$, is not taken as an output keystream itself, as in the conventional RC4 cipher, but rather, in our technique, as one input to a first predefined function, e.g., a first hash function. This first function, in response to this input, $S_t$, multiplied by a variable, C, provides the output pseudo-random sequence, e.g., the keystream. The S-box element $S_t$ is then updated through a second predefined function, e.g., another hash function, having, as its input, the current value of $S_t$ multiplied by the variable C. The variable, C, initially a random variable, is itself updated, for use during a next iteration, through an additive combination, of its current value and a corresponding element in the second array (G), i.e., $G_t$. Both the S-box and G array can be initialized by, e.g., entirely filling each of these arrays with random 32-bit values.

Our inventive technique advantageously operates on a word level, e.g., 32 bits, rather than on a byte level—the latter being a current limitation of RC4. As such, this technique is considerably faster than the RC4 keystream generator. Moreover, this technique, when used to generate a keystream for use in a stream cipher, appears to be just as secure as does the conventional RC4 cipher. Consequently, our technique is particularly well suited for use in devices, e.g., consumer and other low-end products, that have limited computational resources and would not be amenable to use of the RC4 cipher.

Figure 6A:
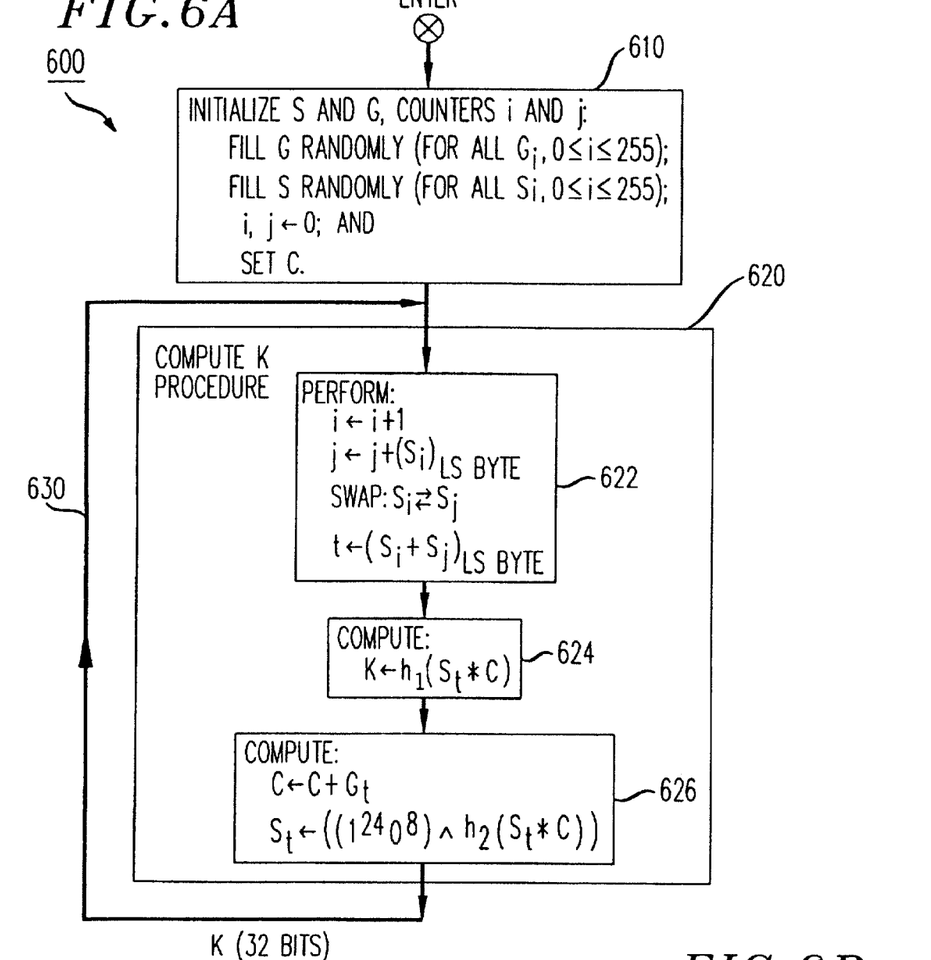
FIG. 6A depicts a flowchart of our inventive keystream generator procedure 600 as would be implemented in client computer 100 shown in FIGS. 2 and 3.

With the above in mind, FIG. 6A depicts a flowchart of our inventive keystream generator procedure 600 as would be implemented in client computer 100 shown in FIGS. 2 and 3. This procedure also uses, two arrays, S and G, collectively shown as arrays 650 graphically depicted in FIG. 6B. The S array provides essentially the same function as does S-box 550 shown in FIG. 5B; hence, the S array shown in FIG. 6B will also be referred hereinafter as an "S-box". For ease of reference, the reader should simultaneously refer to FIGS. 6A and 6B throughout the following discussion.

Figure 6B:
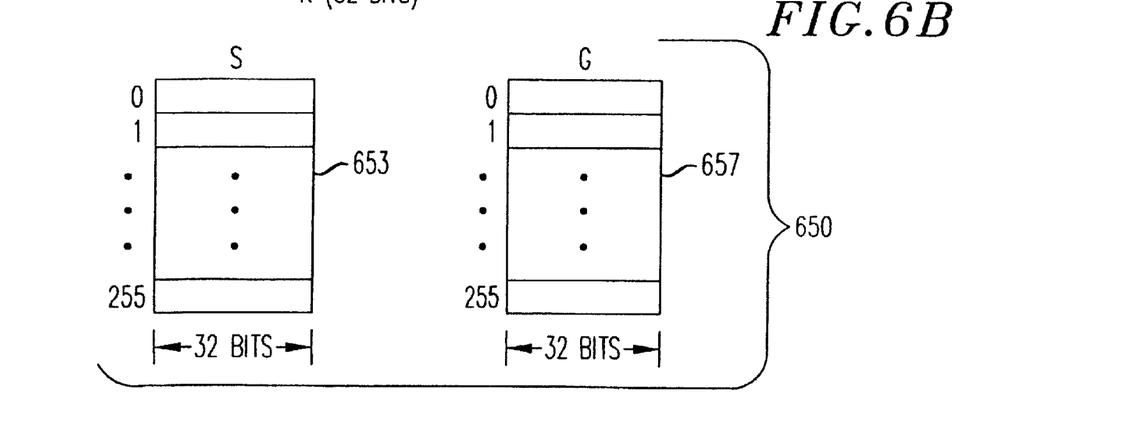
FIG. 6B graphically depicts S and G arrays 653 and 657, respectively, as used in our inventive procedure 600 shown in FIG. 6A.

Upon entry into procedure 600, execution first proceeds to block 610. This block, when executed, initializes both the S and G arrays, sets each of two counters i and j to zero, and initializes a variable C. As shown, S-array 653 and G-array 657 have M and N 32-bit elements, respectively, with both M and N illustratively being 256. Not only do both arrays need not have the same number of elements but also this number is not limited to 256. Though the size of the S-box in the RC4 cipher could be reduced to 64 or even 32 elements, the resulting cipher may not be sufficiently secure. However, we believe our inventive algorithm will retain sufficient security when both the S and G arrays are reduced, in size, to 64 or even 32 elements. However, it is not likely that both the S and G arrays could be reduced in size much below 32 elements and still provide an adequate degree of security.

Both the S and G arrays can be initialized, as shown in block 610, by completely filling both arrays with random 32-bit integers. Alternatively, the least significant byte of all the elements of the S-array could be filled with random permutations ranging from 0 to 255, with the remaining three bytes of these elements in this array being filled in any manner, whether with random 24-bit values or otherwise. Though counters i and j are initialized through block 610 to zero, either or both counters could alternatively be initialized to random 32-bit values. Lastly, block 610 sets variable C to a random 32-bit integer.

Once the initialization has completed, Compute K procedure 620 is iteratively executed to generate a continuous pseudo-random word sequence, i.e., here a keystream, with each successive word of the keystream being generated by a corresponding execution of block 620. Within this procedure, execution first proceeds to block 622 to perform, on a mod($2^{32}$–1) basis, each of the following steps in order:

(a) increment the value of counter i by one;
(b) additively increase the value of counter j by the contents of the least significant byte in element i in S-box 653;
(c) swap the contents of elements i and j (i.e., elements $S_i$ and $S_j$, respectively) in S-box 653; and
(d) set the value of variable t equal to a least significant byte of an additive combination of the contents of elements i and j in S-box 653, i.e., $S_i$ and $S_j$, respectively.

After these operations are performed, execution proceeds to block 624 which, when executed, sets an output 32-bit word, $K_i$, in the keystream, K, according to hash function of a product, involving element t in S-box 653, as given by the following equation:

$$K \leftarrow h_1(S_t * C) \qquad (1)$$

where:
$h_1$ is a hash function of the form $h_1(x)=ax+b$ defined over mod(M) or in Galois field, GF($2^{32}$), with a and b being predefined constants.

Once a current keystream word is determined, execution proceeds to block 626. This block updates the value of variable C according to equation (2) below:

$$C \leftarrow C + G_t \qquad (2)$$

and updates the contents of element t in S-box 653 according to equation (3) below:

$$S_t \leftarrow ((1^{24}0^8) \cap h_2(S_t * C)) \quad (3)$$

where:
- $h_2$ is a hash function of the form $h_2(x)=cx+d$ defined over mod(M) or in Galois field, $GF(2^{32})$, with c and d being predefined constants;
- $1^{24}0^8$ represents 3 bytes (24 bits) of ones followed by a byte (8 bits) of zeroes, i.e., the value "11111111111111111111111100000000"; and $\cap$ represents a logical bit-by-bit AND operation.

As a result of equation (3), only the upper three bytes of element t in the S-box are updated through use of the second hash function, with the least significant byte being set to zero, thereby assuring that the inventive technique exhibits, at a minimum, the same degree of security as does the RC4 cipher. Equations (2) and (3) can be performed either in the order shown or reversed. The term $1^{24}0^8$ could be replaced with $1^{32}$, i.e., a word having 32 one bits.

Once the output keystream word, K, is produced, execution iterates back, via path 630, to block 620 to calculate a next successive keystream word, and so on, as long as our inventive keystream generator is being operated.

As a further variant of our inventive technique, another random variable, D, can be introduced to provide increased security and equation (3) can replaced by equations (4) and (5) as follows:

$$D \leftarrow D + G_t \quad (4)$$

where:
- D is also initialized, during execution of block 610, to a random 32-bit number; and $$S_t \leftarrow ((1^{24}0^8) \hat{}\, h_2(S_t * D)) \quad (5)$$

Furthermore, our inventive technique can also be modified, again to provide enhanced security, by incorporating use of a third hash function. Here, a third hash function, $h_3$, of the form $h_3(x)=ex+f$ defined over mod(M) or in Galois field, $GF(2^{32})$, with e and f being predefined constants, is used. Prior to additively updating, as shown in block 622, the value of counter j by the contents of the least significant byte in element i in S-box 653, the contents of element i in the S-Box can be set as given by equation (6) below:

$$S_i \leftarrow h_3(i). \quad (6)$$

By now those skilled in the art clearly recognize that although we have described our inventive technique in conjunction with a very simple stream cipher, our technique can be used to generate a stream of pseudo-random words for use in any of a wide range of applications, not just cryptography and certainly not just stream ciphers.

Although various embodiments which incorporate the teachings of the present invention have been shown and described in detail herein, those skilled in the art can readily devise many other embodiments that still utilize these teachings.

We claim:

1. A word-oriented method for cryptographically converting, through a stream cipher, an input stream into an output stream, wherein the input stream is either an incoming plaintext message (P) or ciphertext (C) and the output stream is either the ciphertext or a recovered plaintext message ($\hat{P}$), wherein the stream cipher comprises a word-oriented pseudo-random keystream, the method being performed in a computer system having a processor and a memory, the memory storing computer executable instructions, wherein the method comprises the steps, performed by the processor in response to execution of the instructions, of:

(A) receiving each one of a plurality of words in the input stream over an input signal bearing medium, said each one word being either a word in either the incoming plaintext message or in the ciphertext;

(B) establishing, in the memory, first and second arrays (S and G, respectively) containing first and second pluralities of elements, respectively, wherein the elements in the arrays S and G are initialized in a predefined manner;

(C) forming a corresponding word (K) in the keystream for each successive word in the input stream by:
  (C1) first updating a first value, stored in a first counter (i), by a predefined increment;
  (C2) second updating a second value, stored in a second counter (j), by a value stored in a first element ($S_i$) in the array S, the first element being specified by the first value;
  (C3) swapping values stored in two elements in the array S, the two elements being the element $S_i$ and a second element ($Sj$), the second element being specified by the second value;
  (C4) combining contents of the elements $S_i$ and $S_j$ so as to define a third value (t);
  (C5) determining the corresponding word in the keystream, as a first predefined function of a current value stored in a third element ($S_t$) in the first array and a value of a first variable, the third element being specified by the third value;
  (C6) third updating the value of the first variable by a value of one of the elements ($G_t$), specified by the third value, in the array G; and
  (C7) fourth updating the value stored in $S_t$, in response to a second predefined function of both the value stored in the element $S_t$ and the value of said one of the elements ($G_t$) in the array G;

(D) combining the corresponding word in the keystream with said each successive word in the input stream to yield a corresponding word in the output stream, wherein, if the input stream is formed of words of the incoming plaintext message or the ciphertext, the output stream is formed of corresponding words of the ciphertext or the recovered plaintext message, respectively; and (E) applying the corresponding word in the output stream onto an output signal bearing medium.

2. The method in claim 1 wherein the first and second variables are the same (C) and are initialized to a random value.

3. The method in claim 2 wherein each of the elements stored in the arrays S and G is at least 32-bits long.

4. The method in claim 3 wherein the combining step comprises the step of combining the corresponding word in the keystream with said each successive word in the input stream through an exclusive OR operation to yield the corresponding word in the output stream.

5. The method in claim 1 wherein the first predefined function is a linear function of the form $h_1(x)=ax+b$ defined over mod(M) or in Galois field ($GF(2^{32})$) where a, b and M are predefined constants.

6. The method in claim 5 wherein the second predefined function is a linear function of the form $h_2(x)=cx+d$ defined over mod(M) or in Galois field $(GF(2^{32}))$ where c, d and M are predefined constants.

7. The method in claim 6 wherein each of the elements stored in the arrays S and G is at least 32-bits long.

8. The method in claim 7 wherein the combining step comprises the step of combining the corresponding word in the keystream with said each successive word in the input stream through an exclusive OR operation to yield the corresponding word in the output stream.

9. The method in claim 6 further comprising the step, prior to the second updating step, of setting a value stored in the element $S_i$ as given by the following equation:

$$S_i \leftarrow h_3(i)$$

where $h_3$ is a linear function of the form $h_3(x)=ex+f$ defined over mod(M) or in Galois field $(GF(2^{32}))$; and e, f and M are predefined constants.

10. The method in claim 1 wherein the fourth updating step comprises the step of combining, through a bit-by-bit logical AND operation, results of the second predefined function and a predefined value so as to yield an updated value to be stored in the element $S_t$.

11. The method in claim 10 wherein the predefined value is a 32-bit word formed of either three bytes of ones followed by a byte of zeroes, or four bytes of ones.

12. The method in claim 11 wherein each of the elements stored in the arrays S and G is at least 32-bits long.

13. The method in claim 12 wherein the combining step comprises the step of combining the corresponding word in the keystream with said each successive word in the input stream through an exclusive OR operation to yield the corresponding word in the output stream.

14. The method in claim 1 wherein the establishing step further comprises the step of initializing all the elements in the S and G arrays by completely filling the S and G arrays with random numbers.

15. The method in claim 14 wherein each of the elements stored in the arrays S and G is at least 32-bits long.

16. The method in claim 15 wherein the combining step comprises the step of combining the corresponding word in the keystream with said each successive word in the input stream through an exclusive OR operation to yield the corresponding word in the output stream.

17. The method in claim 1 wherein the establishing step further comprises the steps of:

completely filling all the elements in the G array with random numbers; and completely filling a least significant byte of all the elements in the S array with random numbers.

18. The method in claim 17 wherein each of the elements stored in the arrays S and G is at least 32-bits long.

19. The method in claim 18 wherein the combining step comprises the step of combining the corresponding word in the keystream with said each successive word in the input stream through an exclusive OR operation to yield the corresponding word in the output stream.

20. The method in claim 1 wherein the third updating step further comprises the step of updating the value of element $S_t$ in response to both a second variable (D) and a value of one of the elements $(G_t)$, specified by the third value, in the array G; wherein the second variable D is initialized to a random value and subsequently updated in response to the value of said one element $G_t$.

21. The method in claim 20 wherein each of the elements stored in the arrays S and G is at least 32-bits long.

22. The method in claim 21 wherein the combining step comprises the step of combining the corresponding word in the keystream with said each successive word in the input stream through an exclusive OR operation to yield the corresponding word in the output stream.

23. A computer readable medium having computer executable instructions stored therein for performing the steps of claim 1.

24. Apparatus for a computer system which cryptographically converts, through a stream cipher, an input stream into an output stream, wherein the input stream is either an incoming plaintext message (P) or ciphertext (C) and the output stream is either the ciphertext or a recovered plaintext message ($\hat{P}$), wherein the stream cipher comprises a word-oriented pseudo-random keystream, the apparatus comprising:

(A) a processor; and (B) a memory, the memory storing computer executable instructions;

(C) wherein the processor, in response to execution of the stored instructions:

(C1) receives each one of a plurality of words in the input stream over an input signal bearing medium, said each one word being either a word in either the incoming plaintext message or in the ciphertext;

(C2) establishes, in the memory, first and second arrays (S and G, respectively) containing first and second pluralities of elements, respectively, wherein the elements in the arrays S and G are initialized in a predefined manner;

(C3) forms a corresponding word (K) in the keystream for each successive word in the input stream by:

(C3a) first updating a first value, stored in a first counter (i), by a predefined increment;

(C3b) second updating a second value, stored in a second counter (j), by a value stored in a first element $(S_i)$ in the array S, the first element being specified by the first value;

(C3c) swapping values stored in two elements in the array S, the two elements being the element $S_i$ and a second element (Sj), the second element being specified by the second value;

(C3d) combining contents of the elements $S_i$ and Sj so as to define a third value (t);

(C3e) determining the corresponding word in the keystream, as a first predefined function of a current value stored in a third element ($S_t$) in the first array and a value of a first variable, the third element being specified by the third value;

(C3f) third updating the value of the first variable by a value of one of the elements $(G_t)$, specified by the third value, in the array G; and (C3g) fourth updating the value stored in $S_t$, in response to a second predefined function of both the value stored in the element $S_t$ and the value of said one of the elements $(G_t)$ in the array G;

(D) combines the corresponding word in the keystream with said each successive word in the input stream to yield a corresponding word in the output stream, wherein, if the input stream is formed of words of the incoming plaintext message or the ciphertext, the output stream is formed of corresponding words of the ciphertext or the recovered plaintext message, respectively; and (E) applies the corresponding word in the output stream onto an output signal bearing medium.

25. The apparatus in claim 24 wherein the first and second variables are the same (C) and the processor, in response to execution of the stored instructions, initializes the first and second variables to a random value.

26. The apparatus in claim 25 wherein each of the elements stored in the arrays S and G is at least 32-bits long.

27. The apparatus in claim 26 wherein the processor, in response to execution of the stored instructions, combines the corresponding word in the keystream with said each successive word in the input stream through an exclusive OR operation to yield the corresponding word in the output stream.

28. The apparatus in claim 24 wherein the first predefined function is a linear function of the form $h_1(x)=ax+b$ defined over mod(M) or in Galois field ($GF(2^{32})$) where a, b and M are predefined constants.

29. The apparatus in claim 28 wherein the second predefined function is a linear function of the form $h_2(x)=cx+d$ defined over mod(M) or in Galois field ($GF(2^{32})$) where c, d and M are predefined constants.

30. The apparatus in claim 29 wherein each of the elements stored in the arrays S and G is at least 32-bits long.

31. The apparatus in claim 30 wherein the processor, in response to execution of the stored instructions, combines the corresponding word in the keystream with said each successive word in the input stream through an exclusive OR operation to yield the corresponding word in the output stream.

32. The apparatus in claim 29 wherein the processor, in response to execution of the stored instructions and prior to the second updating operation, sets a value stored in the element $S_i$ as given by the following equation:

$$S_i \leftarrow h_3(i)$$

where $h_3$ is a linear function of the form $h_3(x) = ex+f$ defined over mod(M) or in Galois field ($GF(2^{32})$); and e, f and M are predefined constants.

33. The apparatus in claim 24 wherein the processor, in response to execution of the stored instructions and as part of the fourth updating operation, combines, through a bit-by-bit logical AND operation, results of the second predefined function and a predefined value so as to yield an updated value to be stored in the element $S_t$.

34. The apparatus in claim 33 wherein the predefined value is a 32-bit word formed of either three bytes of ones followed by a byte of zeroes, or four bytes of ones.

35. The apparatus in claim 34 wherein each of the elements stored in the arrays S and G is at least 32-bits long.

36. The apparatus in claim 35 wherein the processor, in response to execution of the stored instructions, combines the corresponding word in the keystream with said each successive word in the input stream through an exclusive OR operation to yield the corresponding word in the output stream.

37. The apparatus in claim 24 wherein the processor, in response to the stored instructions, initializes all the elements in the S and G arrays by completely filling the S and G arrays with random numbers.

38. The apparatus in claim 37 wherein each of the elements stored in the arrays S and G is at least 32-bits long.

39. The apparatus in claim 38 wherein the processor, in response to execution of the stored instructions, combines the corresponding word in the keystream with said each successive word in the input stream through an exclusive OR operation to yield the corresponding word in the output stream.

40. The apparatus in claim 24 wherein the processor, in response to execution of the stored instructions:

completely fills all the elements in the G array with random numbers; and completely fills a least significant byte of all the elements in the S array with random numbers.

41. The apparatus in claim 40 wherein each of the elements stored in the arrays S and G is at least 32-bits long.

42. The apparatus in claim 41 wherein the processor, in response to execution of the stored instructions, combines the corresponding word in the keystream with said each successive word in the input stream through an exclusive OR operation to yield the corresponding word in the output stream.

43. The apparatus in claim 24 wherein the processor, in response to execution of the stored instructions and as part of the third updating operation, updates the value of element $S_t$ in response to both a second variable (D) and a value of one of the elements ($G_t$), specified by the third value, in the array G; wherein the processor, in response to the stored instructions, initializes the second variable D to a random value and subsequently updates the second variable D in response to the value of said one element $G_t$.

44. The apparatus in claim 43 wherein each of the elements stored in the arrays S and G is at least 32-bits long.

45. The apparatus in claim 44 wherein the processor, in response to execution of the stored instructions, combines the corresponding word in the keystream with said each successive word in the input stream through an exclusive OR operation to yield the corresponding word in the output stream.

* * * * *